United States Patent
Livingston (10) Patent No.: US 6,757,117 B1
(45) Date of Patent: Jun. 29, 2004

(54) DATA DETECTION IN A DISK DRIVE SYSTEM USING ERASURE POINTERS

(75) Inventor: Jay N. Livingston, Superior, CO (US)

(73) Assignee: Cirrus Logic, Inc., Austin, TX (US)

(*) Notice: Subject to any disclaimer, the term of this patent is extended or adjusted under 35 U.S.C. 154(b) by 491 days.

(21) Appl. No.: 09/939,137

(22) Filed: Aug. 24, 2001

(51) Int. Cl.[7] .................................................. G11B 5/02
(52) U.S. Cl. .............................. 360/25; 360/31; 360/53; 714/794; 714/795
(58) Field of Search ................................ 714/794, 795; 360/53, 25, 31

(56) References Cited

U.S. PATENT DOCUMENTS 5,942,005 A * 8/1999 Hassner et al. ............. 714/784
6,446,236 B1 * 9/2002 McEwen et al. ............ 714/795

\* cited by examiner

Primary Examiner—David Hudspeth
Assistant Examiner—Dan I. Davidson
(74) Attorney, Agent, or Firm—Duft Setter Ollila & Bornsen LLC (57) ABSTRACT

Control circuitry for a disk drive system that has improved data detection by using log likelihood values and erasure pointers. The control circuitry is comprised of a log likelihood modification system and a decoder. The log likelihood modification system receives log likelihood values that represent data and erasure pointers. The erasure pointers point to at least one of the log likelihood values that has been corrupted in some manner. The log likelihood modification system sets the log likelihood values, that the erasure pointer points to, to an error value to generate modified log likelihood values. The log likelihood modification system transfers the modified log likelihood values to the decoder. The decoder processes the modified log likelihood values based on code constraints to generate estimated log likelihood values. The decoder then decodes the data from the estimated log likelihood values.

20 Claims, 6 Drawing Sheets

DATA DETECTION IN A DISK DRIVE SYSTEM USING ERASURE POINTERS

BACKGROUND OF THE INVENTION

1. Field of the Invention

The invention is related to the field of disk drive systems, and in particular to a system and method of improved data detection using erasure pointers.

2. Statement of the Problem

Disk drive systems store data on magnetic storage media such as a magnetic disk. The magnetic disk contains a series of circular tracks that span the surface of the disk. User data and servo data are encoded and written on the tracks of the disk, and are represented by magnetic transitions on the disk. The disk drive system uses the servo data to locate the user data.

Typical disk drive systems are comprised of a disk device, write channel circuitry, and read channel circuitry. The write channel receives data, generates a write signal from the data, and transfers the write signal to the disk device. The disk device stores the data on storage media. Subsequently, the disk device reads data from the storage media, generates a read signal, and transfers the read signal to the read channel. The read channel processes the read signal to reproduce the data.

In magnetic disk devices, events such as thermal asperities can dramatically degrade error rate performance of the disk drive system. Thermal asperities are defects on a disk that causes a read head to heat or cool. The temperature change in the read head causes the read head to generate a signal with corrupted data. A thermal asperity detector detects the thermal asperities and identifies any corrupted data caused by the thermal asperities. The thermal asperity detector identifies the corrupted data with erasure pointers. Erasure pointers are control signals that identify corrupted data.

To reproduce the data from the read signal, the read channel includes a sampler, filter, and interpolator that function together to sample and process the read signal to generate interpolated samples. A detector in the read channel uses a detection algorithm, such as a Viterbi state machine, to convert the interpolated samples into an encoded signal that represents the data. The data is represented in the encoded signal by symbols. A Reed Solomon decoder in the read channel receives the encoded signal and the erasure pointers. The Reed Solomon decoder erases symbols in the encoded signal that the erasure pointers point to. The Reed Solomon decoder estimates what the erased symbols should be based on properties of the Reed Solomon encoding technique and replaces the erased symbols with the estimates. The Reed Solomon decoder then decodes the encoded signal by applying a decoding algorithm, such as a Soft Output Reed Solomon (SORS) algorithm, and code constraints to generate a data signal. Code constraints are rules for decoding data that are created by the encoding technique used to encode the data. For instance, a D=1 constraint means that an encoder has to insert a 0 between consecutive 1's. Unfortunately, using erasure pointers to identify corrupted data is only used in a Reed Solomon decoder.

Some disk drive systems use decoders that implement other iterative decoding algorithms, such as Low Density Parity Check (LDPC) or Turbo Codes, but do not receive erasure pointers. Error rate performance of the disk drive system can be dramatically degraded by thermal asperities when using the iterative decoding algorithms without erasure pointers. When a decoder receives corrupted data, the decoder generates estimated values based on the corrupted data. Thus, the estimated values progressively get worse for both the corrupted data and the n on-corrupted data. Unfortunately, the corrupted data causes the decoder to generate poor estimated values and increases the error rate of the disk drive system.

Currently, there are algorithms that process input values that represent bits to generate log likelihood values. The log likelihood values, generated for each input value, are estimates of the probability that the input value represents a 1 versus a 0. In other words, the log likelihood values can be represented by:

Log likelihood values=log{(Probability bit=1)/(Probability bit=0)}.

The log likelihood values are generated by algorithms such as Soft Output Viterbi Algorithm (SOVA), BCJR, and other algorithms. Unfortunately, log likelihood values have not been implemented in disk drive systems to improve data detection.

SUMMARY OF THE SOLUTION

The invention helps to solve the above problems in one example with control circuitry that uses log likelihood values and erasure pointers to decode data from a read signal. The erasure pointers point to corrupted data. The control circuitry changes the log likelihood values that represent the corrupted data. The control circuitry then iteratively generates estimated log likelihood values that represent both the corrupted and non-corrupted data. Thus, the control circuitry generates better estimates of the corrupted data and the non-corrupted data and advantageously improves the error rate performance of a disk drive system. The control circuitry also helps reduce the occurrence of error propagation caused by iterative decoding.

The control circuitry is comprised of a log likelihood modification system and a decoder. The log likelihood modification system is configured to receive log likelihood values that represent data. The log likelihood modification system is also configured to receive erasure pointers. The erasure pointers point to at least one of the log likelihood values. The log likelihood modification system is configured to set the log likelihood values, that the erasure pointers point to, to an error value to generate modified log likelihood values. In some examples, the error value is zero. The log likelihood modification system is configured to transfer the modified log likelihood values to the decoder. The decoder is configured to process the modified log likelihood values based on code constraints to generate estimated log likelihood values. The decoder is also configured to decode the data from the estimated log likelihood values.

In another example of the invention, the decoder comprises a buffer, an update system, and a decision system. The buffer receives and buffers the modified log likelihood values. The update system processes the blocks of the modified log likelihood values using an iterative decoding algorithm. The iterative decoding algorithm adjusts the modified log likelihood values based on extrinsic information provided by the code constraints to generate estimated log likelihood values. The update system transfers the estimated log likelihood values to the decision system. The decision system processes the estimated log likelihood values to generate the data.

DETAILED DESCRIPTION OF THE INVENTION

Figure 1:
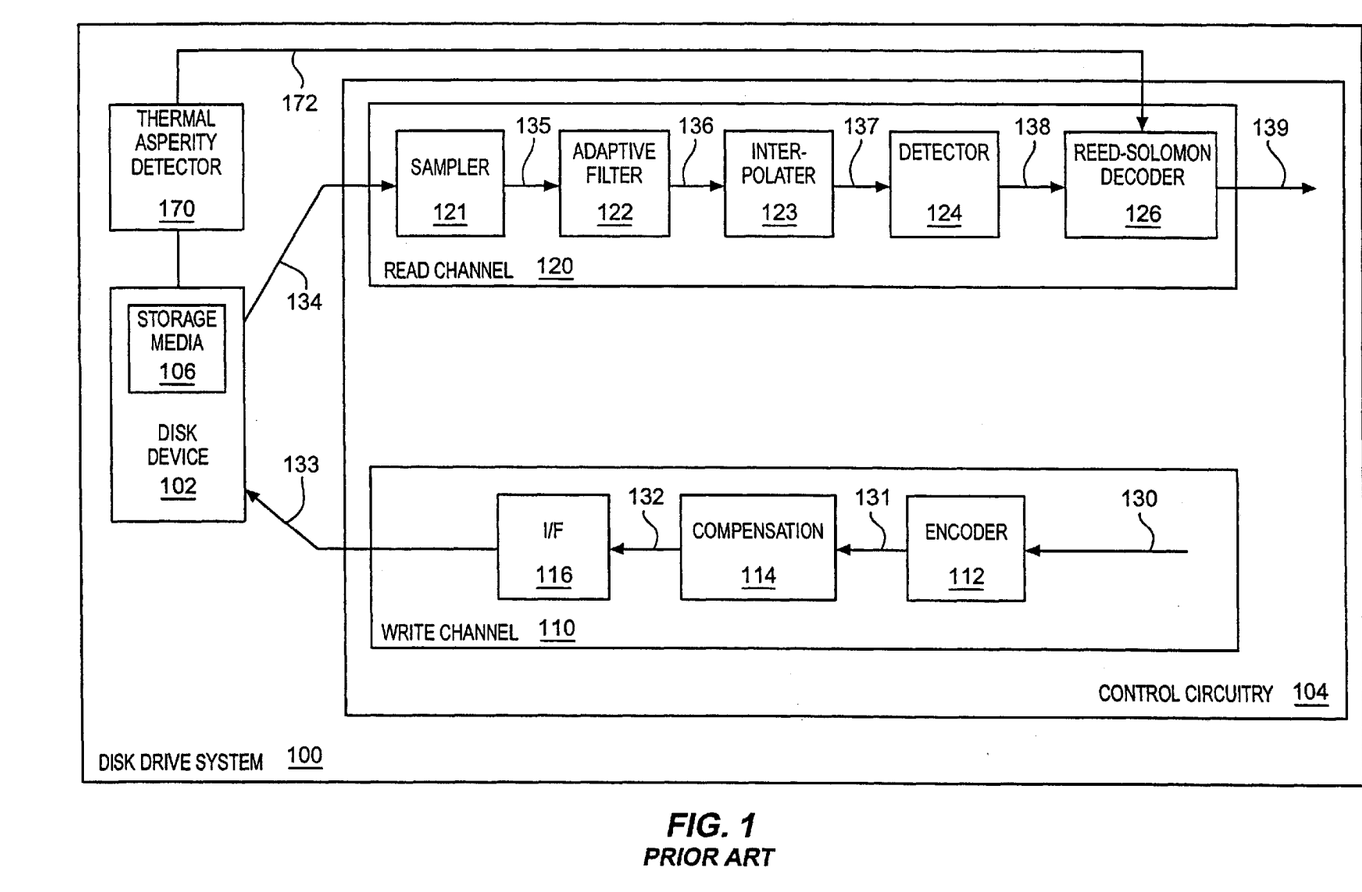
FIG. 1 is a block diagram that illustrates a disk drive system in the prior art.
Figure 2:
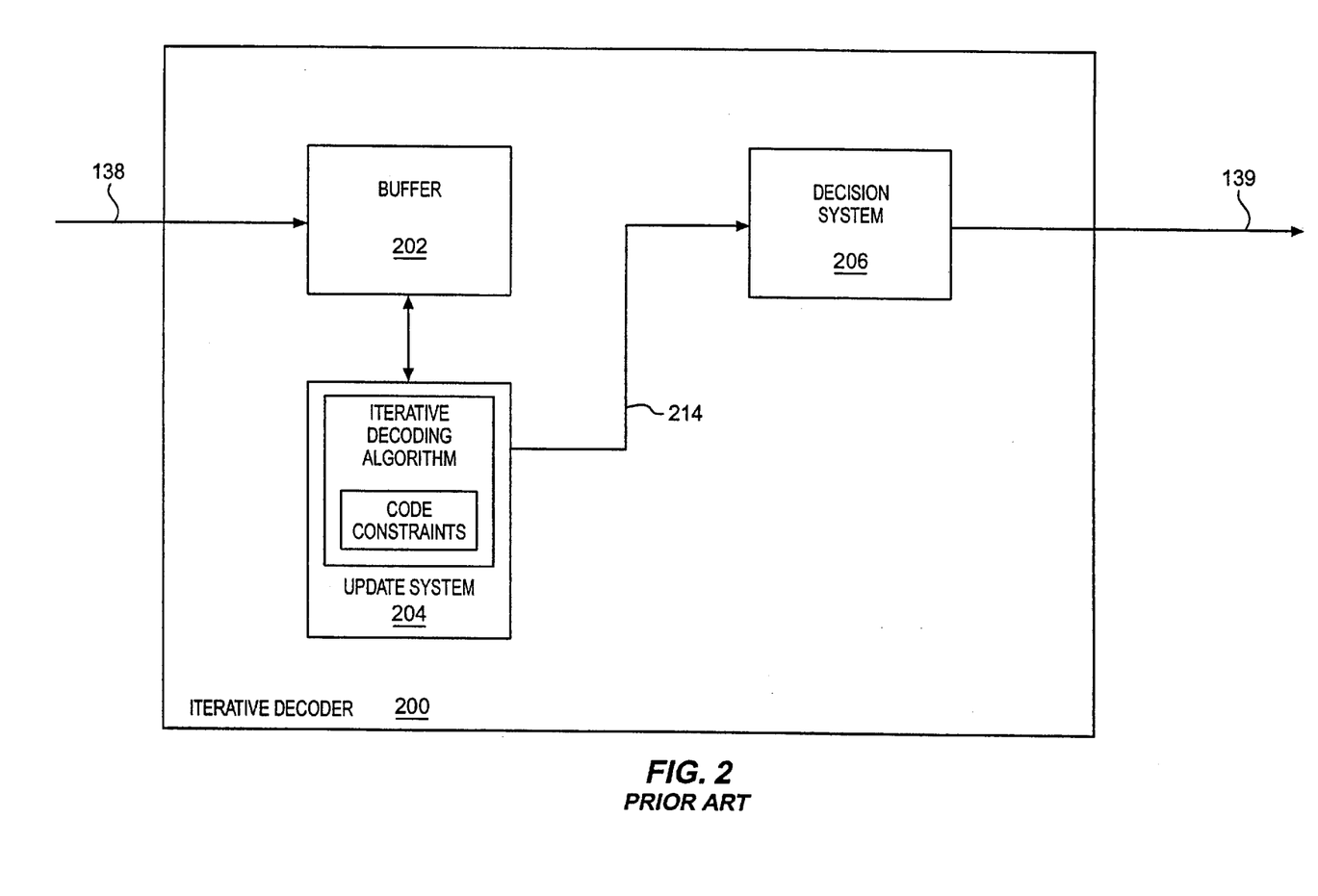
FIG. 2 is a block diagram that illustrates an iterative decoder in the prior art.

Prior Art Disk Drive System—FIGS. 1–2

FIG. 1 shows an example of a disk drive system 100 in the prior art. Disk drive system 100 includes a disk device 102 and associated control circuitry 104. Disk device 102 includes storage media 106. Storage media 106 is a magnetic disk. Control circuitry 104 includes write channel 110 and read channel 120. Write channel 110 includes encoder 112, compensation 114, and write interface 116 connected in series. Read channel 120 includes sampler 121, adaptive filter 122, interpolator 123, detector 124, and Reed Solomon decoder 126 connected in series. Interface 116 and sampler 121 are coupled to disk device 102. Disk drive system 100 also includes a thermal asperity detector 170 coupled to disk device 102 and Reed Solomon decoder 126.

Data signal 130 carries data. Write channel 110 receives data signal 130 and transfers a corresponding write signal 133 to disk device 102. Disk device 102 stores the data on storage media 106. Subsequently, disk device 102 reads storage media 106 and transfers a corresponding read signal 134 to read channel 120. The write signal 133 and the read signal 134 should both represent the data. Read channel 120 processes the read signal 134 to generate data signal 139. Ideally, data signal 139 carries the same data as data signal 130.

Thermal asperity detector 170 detects thermal asperities on disk device 102. Thermal asperity detector 170 generates erasure pointers 172 that indicate what data has been affected by the thermal asperities on disk device 102. Thermal asperity detector 170 transfers the erasure pointers 172 to Reed Solomon decoder 126.

Write channel 110 operates as follows. Encoder 112 receives and encodes data signal 130 to generate an encoded signal 131. The encoding provides error-checking capability when the data is subsequently decoded. Encoder 112 transfers the encoded signal 131 to compensation 114. Compensation 114 adjusts the timing of transitions in the encoded signal 131 to generate a time-adjusted signal 132. Compensation 114 transfers the time-adjusted signal 132 to interface 116. Interface 116 converts the time-adjusted signal 132 from digital to analog to generate the write signal 133. Interface 116 transfers the write signal 133 to disk device 102.

The write signal 133 drives a magnetic head that alters a magnetic field to create magnetic transitions on the magnetic disk. These magnetic transitions should represent the data. The magnetic head subsequently detects the magnetic transitions to generate the read signal 134.

Read channel 120 operates as follows. Sampler 121 receives and samples the read signal 134 to generate read samples 135. Sampler 121 transfers the read samples 135 to adaptive filter 122. Adaptive filter 122 removes distortion by shaping the read samples 135 to generate equalized samples 136. Adaptive filter 122 transfers the equalized samples 136 to interpolator 123. Interpolator 123 synchronizes the equalized samples 136 with a clock for detector 124 to generate interpolated samples 137. Interpolator 123 transfers the interpolated samples 137 to detector 124. Detector 124 uses a detection algorithm, such as a Viterbi state machine, to convert the interpolated samples 137 into an encoded signal 138 that represents the data.

Reed Solomon decoder 126 receives the encoded signal 138 and the erasure pointers 172. The encoded signal 138 includes symbols that represent the data. Reed Solomon decoder 126 erases the symbols in the encoded signal 138 that the erasure pointers 172 point to. Reed Solomon decoder 126 then processes the encoded signal 138, including the erased symbols, using a Soft Output Reed Solomon (SORS) algorithm. The SORS algorithm adjusts the symbols in the encoded signal 138 based on extrinsic information provided by the code constraints. Reed Solomon decoder 126 then decodes the encoded signal 138 by applying decoding techniques and the code constraints to generate data signal 139. Reed Solomon decoder 126 also performs error-checking functions. Data signal 139 should substantially represent the data.

FIG. 2 is a block diagram that illustrates an alternative decoder to Reed Solomon decoder 126 in disk drive system 100. Iterative decoder 200 is comprised of buffer 202, update system 204, and decision system 206. Iterative decoder 200 does not receive the erasure pointers 172.

In operation, buffer 202 receives and buffers the encoded signal 138. Update system 204 processes the encoded signal 138, buffered in buffer 202, using an iterative decoding algorithm. The iterative decoding algorithm adjusts the symbols in the encoded signal 138 based extrinsic information provided by the code constraints to generate improved encoded signal 214. Update system 204 transfers the improved encoded signal 214 to decision system 206. Decision system 206 processes the improved encoded signal 214 to generate data signal 139. Data signal 139 should substantially represent the data.

Figure 3:
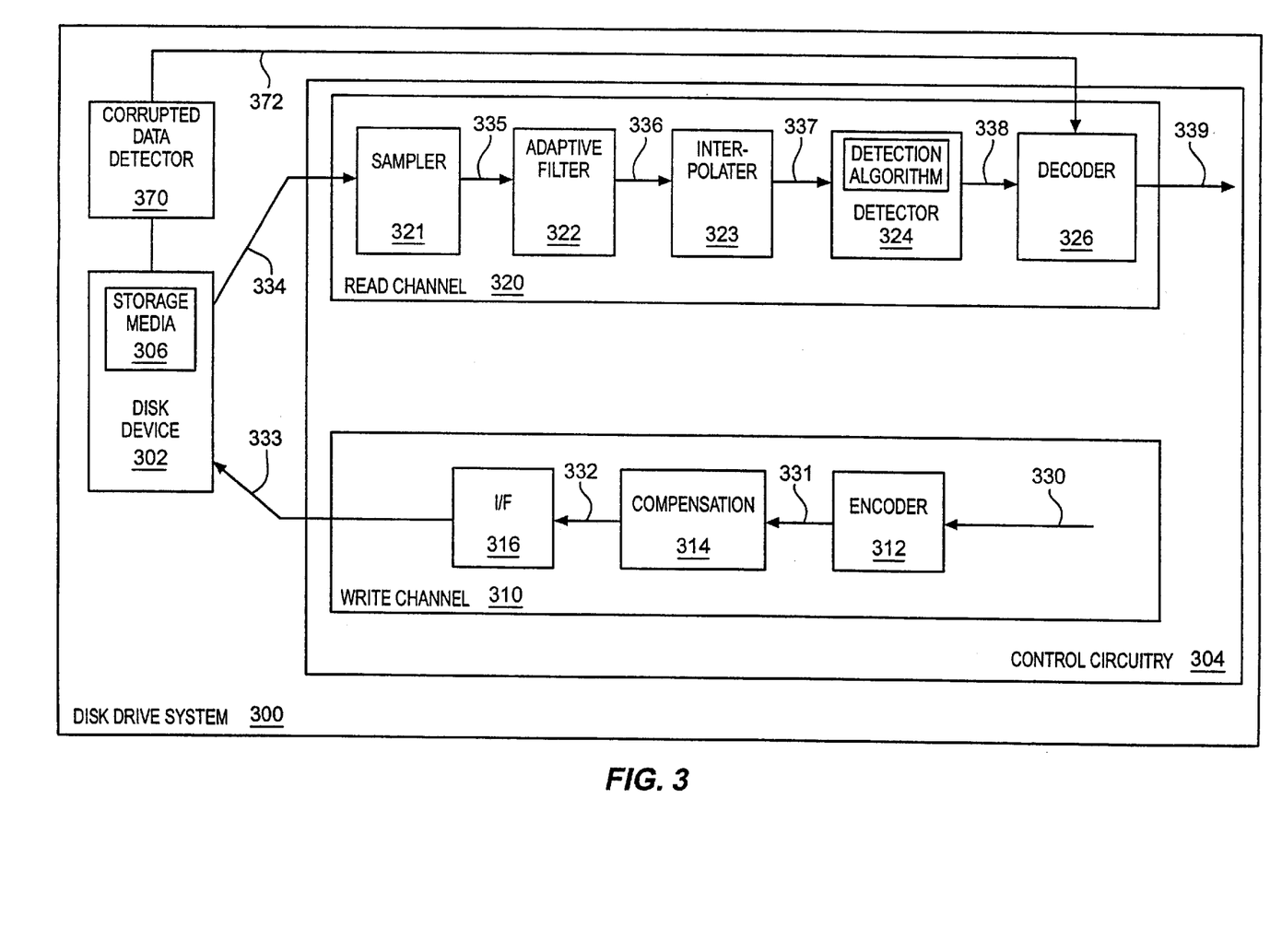
FIG. 3 is a block diagram that illustrates a disk drive system in an example of the invention.

Disk Drive System Configuration and Operation—FIG. 3

FIG. 3 depicts a specific example of a disk drive system in accord with the present invention. Those skilled in the art will appreciate numerous variations from this example that do not depart from the scope of the invention. Those skilled in the art will also appreciate that various features described could be combined with other embodiments to form multiple variations of the invention. Those skilled in the art will appreciate that some conventional aspects of FIG. 3 have been simplified or omitted for clarity.

FIG. 3 shows disk drive system 300 that includes disk device 302 and associated control circuitry 304. Disk device 302 includes storage media 306. Storage media 306 could be a magnetic disk. Control circuitry 304 includes write channel 310 and read channel 320. Write channel 310 includes encoder 312, compensation 314, and write interface 316 connected in series. Read channel 320 includes sampler 321, adaptive filter 322, interpolator 323, detector 324, and decoder 326 connected in series. Interface 316 and sampler 321 are coupled to disk device 302. Disk drive system 300 also includes a corrupt data detector 370 coupled to disk device 302 and decoder 326.

Data signal 330 carries data. Write channel 310 receives data signal 330 and transfers a corresponding write signal 333 to disk device 302. Disk device 302 stores the data on storage media 306. Subsequently, disk device 302 reads storage media 306 and transfers a corresponding read signal 334 to read channel 320. The write signal 333 and the read signal 334 should both represent the data. Read channel 320 processes the read signal 334 to generate data signal 339. Ideally, data signal 339 carries the same data as data signal 330.

Write channel 310 operates as follows. Encoder 312 receives and encodes data signal 330 to generate encoded signal 331. The encoding provides error-checking capability when the data is subsequently decoded. Encoder 312 transfers the encoded signal 331 to compensation 314. Compensation 314 adjusts the timing of transitions in the encoded signal 331 to generate a time-adjusted signal 332. Compensation 314 transfers the time-adjusted signal 332 to interface 316. Interface 316 converts the time-adjusted signal 332 from digital to analog to generate the write signal 333. Interface 316 transfers the write signal 333 to disk device 302.

Read channel 320 operates as follows. Sampler 321 receives and samples the read signal 334 to generate read samples 335. Sampler 321 transfers the read 20 samples 335 to adaptive filter 322. Adaptive filter 322 removes distortion by shaping the read samples 335 to generate equalized samples 336. Adaptive filter 322 transfers the equalized samples 336 to interpolator 323. Interpolator 323 synchronizes the equalized samples 336 with a clock for detector 324 to generate interpolated samples 337. Interpolator 323 transfers the interpolated samples 337 to detector 324. Detector 324 uses a detection algorithm, such as a Soft Output Viterbi Algorithm (SOVA), to convert the interpolated samples 337 to log likelihood values 338. Decoder 326 receives the log likelihood values 338 from detector 324. Decoder 326 also receives erasure pointers 372 from corrupted data detector 370. Decoder 326 decodes the log likelihood values 338 using decoding techniques, such as Low Density Parity Check (LDPC), code constraints, and the erasure pointers 372 to generate data signal 339. Decoder 326 also performs error-checking functions. Data signal 339 should substantially represent the data A Decoder with a Log Likelihood Modification System—FIGS. 4–6

Figure 4:
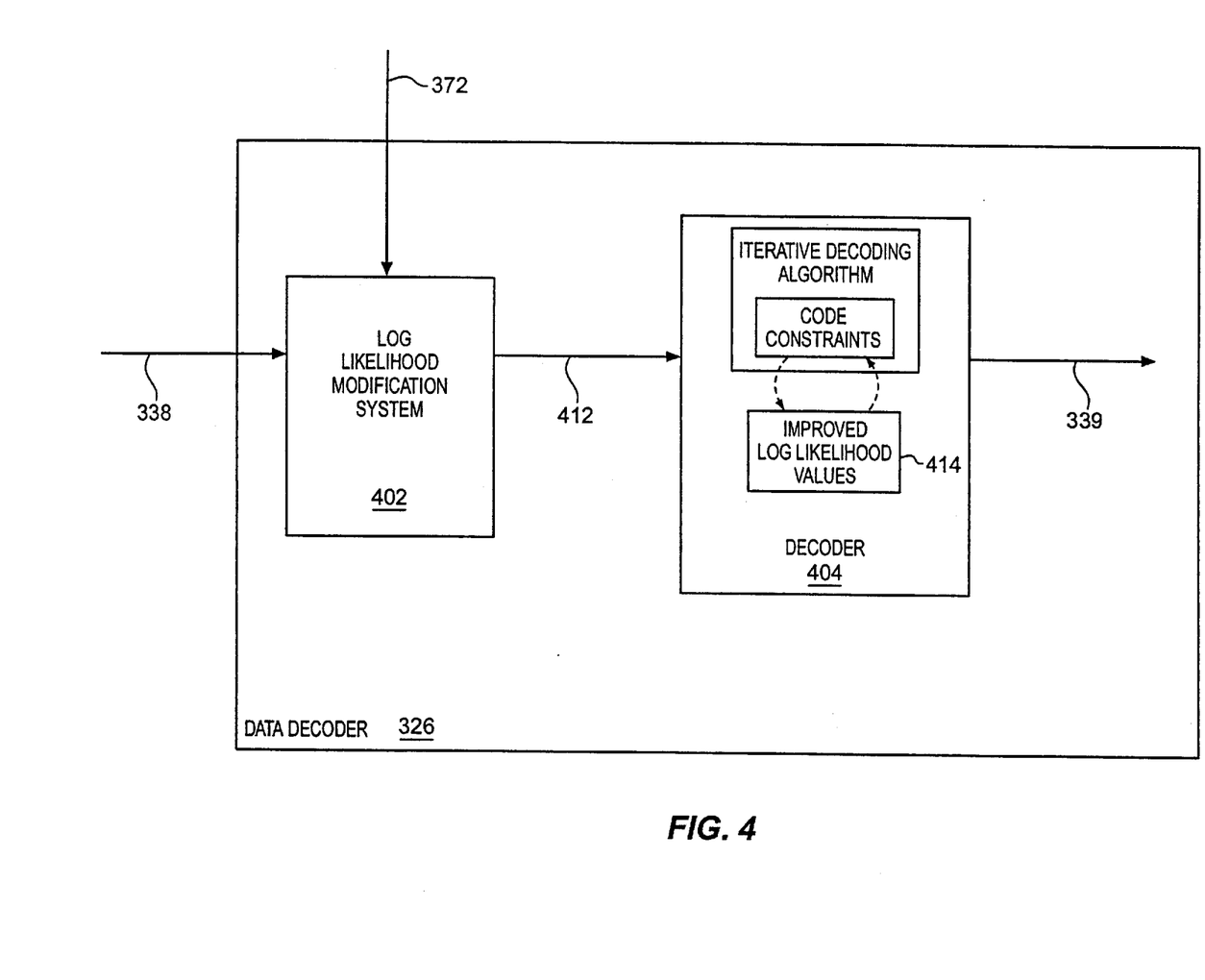
FIG. 4 is a block diagram that illustrates a decoder with a log likelihood modification system in an example of the invention.
Figure 5:
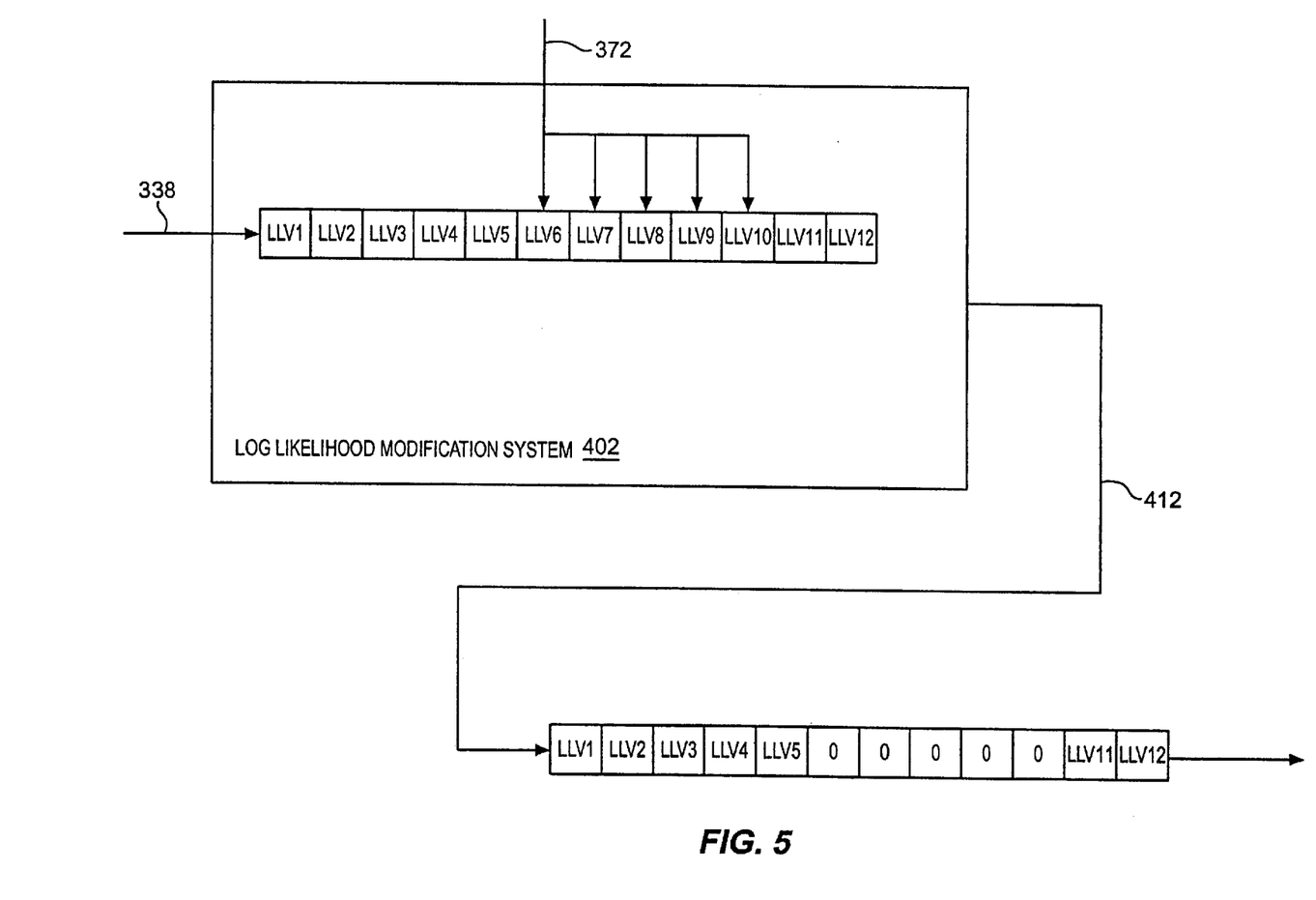
FIG. 5 is a block diagram that illustrates a data-level operation of a log likelihood modification system in an example of the invention.
Figure 6:
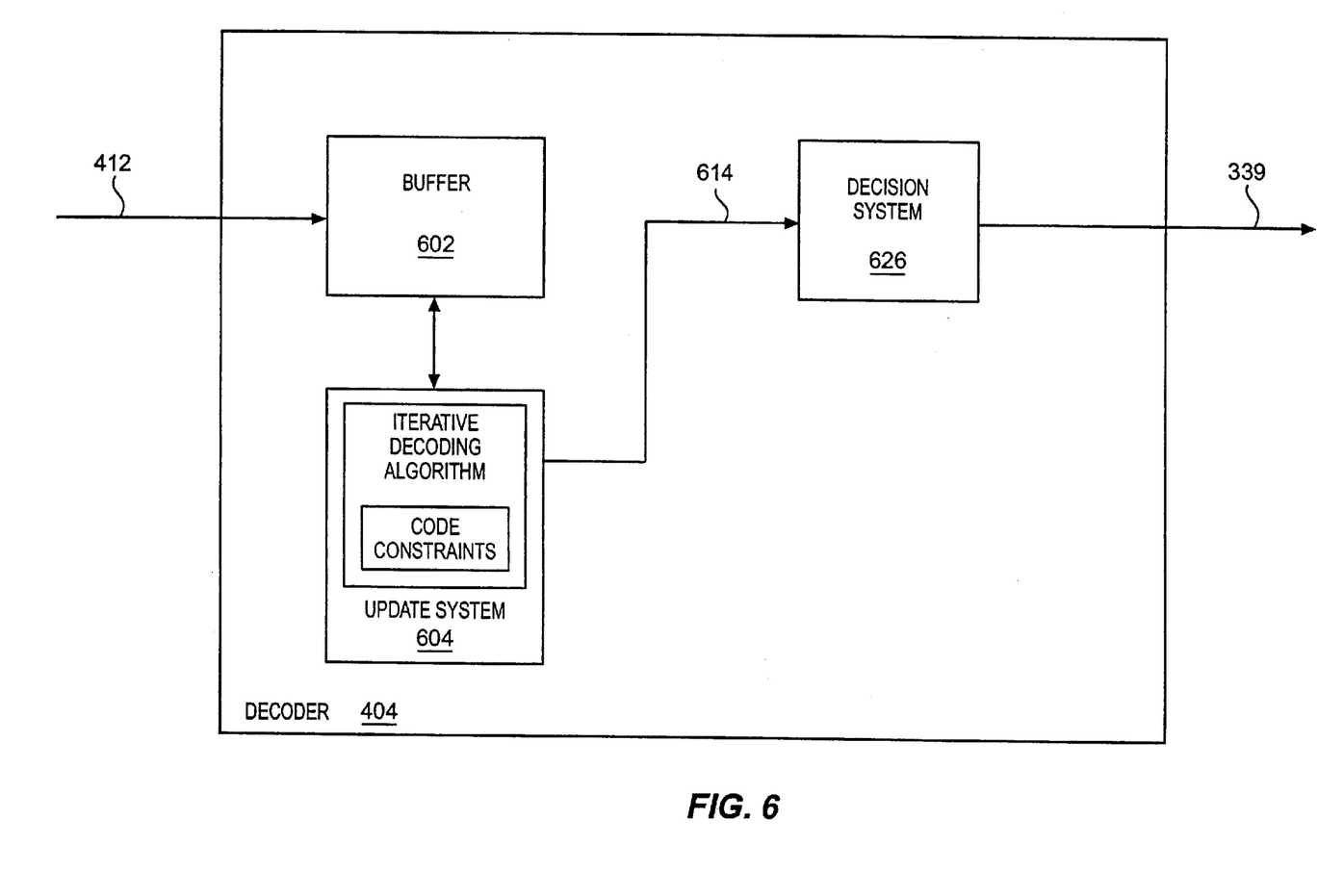
FIG. 6 is a block diagram that illustrates a decoder in an example of the invention.

FIGS. 4–6 depict specific examples of a decoder in accord with the present invention. Those skilled in the art will appreciate numerous variations from these examples that do not depart from the scope of the invention. Those skilled in the art will also appreciate that various features described could be combined with other embodiments to form multiple variations of the invention. Those skilled in the art will appreciate that some conventional aspects of FIGS. 4–6 have been simplified or omitted for clarity.

FIG. 4 is a block diagram that illustrates decoder 326 in an example of the invention. Decoder 326 is comprised of log likelihood modification system 402 coupled to decoder 404. In operation, log likelihood modification system 402 receives the log likelihood values 338. Log likelihood modification system 402 also receives the erasure pointers 372 from corrupt data detector 370. The erasure pointers 372 point to at least one of the log likelihood values 338. Log likelihood modification system 402 sets the log likelihood values 338, that the erasure pointers 372 points to, to an error value to generate modified log likelihood values 412. In some examples, the error value is zero. Log likelihood modification system 402 transfers the modified log likelihood values 412 to decoder 404. Decoder 404 processes the modified log likelihood values 412 based on code constraints to generate improved log likelihood values 414. Decoder 404 then decodes the data from the improved log likelihood values 414. The data is represented in FIG. 4 as data signal 339.

FIG. 5 is a block diagram that illustrates an example of how log likelihood modification system 402 could modify the log likelihood values 338 based on the erasure pointers 372. FIG. 5 shows twelve log likelihood values 338 and twelve modified log likelihood values 412 for this example. Log likelihood modification system 402 receives the log likelihood values 338 and the erasure pointers 372. The erasure pointers 372 point to LLV6–LLV1 of the log likelihood values 338. LLV6–LLV10 represent corrupted data. The corrupted data could have been caused by thermal asperities occurring on disk device 302. Log likelihood modification system 402 changes LLV6–LLV10 to zero. Log likelihood modification system 402 transfers the modified log likelihood values 412. Decoder 404 will then adjust the modified log likelihood values 412 based on the code constraints to estimate what the corrupted data was before being corrupted. Zeroing out the corrupted data makes the probability that decoder 404 will decode the corrupted data as a one, equal to the probability that decoder 404 will decode the corrupted data as a zero. Log likelihood modification system 402 eliminates bad log likelihood values generated by detector 324 due to the corrupted data, and decoder 404 replaces the corrupted data with estimates of the correct log likelihood values.

FIG. 6 is a block diagram that illustrates an example of decoder 404 in an example of the invention. Decoder 404 is comprised of buffer 602, up date system 604, and decision system 606. Buffer 602 is coupled to update system 604. Update system 604 is coupled to decision system 606.

In operation, buffer 602 receives and buffers the modified log likelihood values 412. Update system 604 processes the modified log likelihood values 412, buffered in buffer 602, using an iterative decoding algorithm. Examples of the iterative decoding algorithm include LDPC, Turbo Codes, or Soft Output Reed Solomon (SORS). The iterative decoding algorithm adjusts the modified log likelihood values 412 based on extrinsic information provided by the code constraints to generate estimated log likelihood values 614. An example of a code constraint is a D=0 constraint. Update system 604 transfers the estimated log likelihood values 614 to decision system 606.

Those skilled in the art will appreciate that the iterative decoding algorithm repeatedly adjusts the modified log likelihood values 412 to improve the estimated log likelihood values 614. For LDPC for instance, each bit is included in several different parity constrained code words. For each code word covering a given bit, extrinsic information is computed from the log likelihood values of all the other bits in the parity code word. This extrinsic information is then used to update the log likelihood value for this bit.

Decision system 606 decodes the data from the estimated log likelihood values 614. The data signal is shown as data signal 339. As an example of decoding, decision system 606 could include a threshold log likelihood value of zero. If the log likelihood value for a given bit is greater than zero, then the probability that the bit is a one is greater than the probability that the bit is a zero. If the log likelihood value for a given bit is less than zero, then the probability that the bit is a zero is greater than the probability that the bit is a one.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of operating control circuitry for a disk drive system, the method comprising:

receiving initial log likelihood values that represent data stored on a disk device;

receiving an erasure pointer that points to at least one of the initial log likelihood values;

setting the at least one of the initial log likelihood values to an error value to generate modified log likelihood values;

processing the modified log likelihood values based on code constraints to generate estimated log likelihood values; and decoding the data from the estimated log likelihood values.

2. The method of claim 1 wherein the error value is zero.

3. The method of claim 1 further comprising:

receiving samples generated from a read signal read from the disk device; and processing the samples using an algorithm to generate the initial log likelihood values.

4. The method of claim 3 wherein the algorithm comprises a Soft Output Viterbi Algorithm (SOVA).

5. The method of claim 1 wherein processing the modified log likelihood values further comprises:
   buffering the modified log likelihood values; and
   processing the modified log likelihood values using an iterative decoding algorithm to generate the estimated log likelihood values.

6. The method of claim 5 wherein the iterative decoding algorithm comprises a Low Density Parity Check (LDPC) algorithm.

7. The method of claim 5 wherein the iterative decoding algorithm comprises a Turbo Code algorithm.

8. The method of claim 5 wherein the iterative decoding algorithm comprises a Soft Output Reed Solomon (SORS) algorithm.

9. The method of claim 1 wherein decoding the data from the estimated log likelihood values further comprises:
   if one of the estimated log likelihood values is less than zero, then decoding a zero for a bit corresponding with the one of the estimated log likelihood values; and
   if the one of the estimated log likelihood values is greater than zero, then decoding a one for the bit corresponding with the one of the estimated log likelihood values.

10. The method of claim 1 further comprising generating the erasure pointer with a thermal asperity detector wherein the thermal asperity detector is configured to detect and identify corrupted data on the disk device that is corrupted due to thermal asperities.

11. Control circuitry for a disk drive system, comprising:
   a log likelihood modification system configured to receive initial log likelihood values that represent data stored on a disk device, receive an erasure pointer that points to at least one of the initial log likelihood values, set the at least one of the initial log likelihood values to an error value to generate modified log likelihood values, and transfer the modified log likelihood values; and
   a decoder coupled to the log likelihood modification system and configured to receive the modified log likelihood values, process the modified log likelihood values based on code constraints to generate estimated log likelihood values, and decode the data from the estimated log likelihood values.

12. The control circuitry of claim 11 wherein the error value is zero.

13. The control circuitry of claim 11 further comprising a detector configured to:
   receive samples generated from a read signal read from the disk device; and
   process the samples using an algorithm to generate the initial log likelihood values.

14. The control circuitry of claim 13 wherein the algorithm comprises a Soft Output Viterbi Algorithm (SOVA).

15. The control circuitry of claim 11 wherein the decoder comprises:
   a buffer configured to receive and buffer the modified log likelihood values;
   an update system coupled to the buffer and configured to process the modified log likelihood values using an iterative decoding algorithm to generate the estimated log likelihood values; and
   a decision system configured to receive the estimated log likelihood values and decode the data from the estimated log likelihood values.

16. The control circuitry of claim 15 wherein the iterative decoding algorithm comprises a Low Density Parity Check (LDPC) algorithm.

17. The control circuitry of claim 15 wherein the iterative decoding algorithm comprises a Turbo Code algorithm.

18. The control circuitry of claim 15 wherein the iterative decoding algorithm comprises a Soft Output Reed Solomon (SORS) algorithm.

19. The control circuitry of claim 15 wherein the decision system is further configured to:
   receive the estimated log likelihood values;
   if one of the estimated log likelihood values is less than zero, then decode a zero for a bit corresponding with the one of the estimated log likelihood values; and
   if the one of the estimated log likelihood values is greater than zero, then decode a one for the bit corresponding with the one of the estimated log likelihood values.

20. The control circuitry of claim 11 further comprising a thermal asperity detector configured to detect and identify corrupted data on the disk device that is corrupted due to thermal asperities, generate the erasure pointer, and transfer the erasure pointer to the log likelihood modification system.

* * * * *

UNITED STATES PATENT AND TRADEMARK OFFICE
CERTIFICATE OF CORRECTION

PATENT NO. : 6,757,117 B1
DATED : June 29, 2004
INVENTOR(S) : Jay N. Livingston

It is certified that error appears in the above-identified patent and that said Letters Patent is hereby corrected as shown below:

Column 4,
Line 25, replace "symbols in the encoded signal 138 bases extrinsic informa-"
with -- symbols in the encoded signal 138 based on extrinsic informa- --

Column 5,
Line 7, replace "samples 335. Sampler 321 transfers the read 20 samples 335" with
-- samples 335. Sampler 321 transfers the read samples 335 --

Signed and Sealed this

Seventeenth Day of August, 2004

JON W. DUDAS
*Acting Director of the United States Patent and Trademark Office*